US011956598B2

(12) United States Patent
Bayer et al.

(10) Patent No.: US 11,956,598 B2
(45) Date of Patent: Apr. 9, 2024

(54) LOUDSPEAKER BOX AND HEARING DEVICE

(71) Applicant: Sivantos Pte. Ltd., Singapore (SG)

(72) Inventors: Kevin Bayer, Erlangen (DE); Stefanie Beyfuss, Erlangen (DE); Holger Kral, Fuerth (DE); Hartmut Ritter, Neunkirchen (DE)

(73) Assignee: Sivantos Pte. Ltd., Singapore (SG)

( * ) Notice: Subject to any disclaimer, the term of this patent is extended or adjusted under 35 U.S.C. 154(b) by 375 days.

(21) Appl. No.: 17/145,760

(22) Filed: Jan. 11, 2021

(65) Prior Publication Data

US 2021/0219078 A1 Jul. 15, 2021

(30) Foreign Application Priority Data

Jan. 9, 2020 (DE) ........................ 102020200164.2

(51) Int. Cl.
*H04R 25/00* (2006.01)
*H04R 1/10* (2006.01)

(52) U.S. Cl.
CPC ......... *H04R 25/604* (2013.01); *H04R 1/1075* (2013.01); *H04R 25/65* (2013.01)

(58) Field of Classification Search
CPC ..... H04R 25/604; H04R 1/1075; H04R 25/65
USPC .......................................................... 381/322
See application file for complete search history.

(56) References Cited

U.S. PATENT DOCUMENTS 9,301,067 B2 3/2016 Moeller et al.
10,206,296 B2 2/2019 Wright et al.
10,873,818 B2 * 12/2020 Flaig .................... H04R 25/604
2002/0106096 A1 8/2002 Vonlanthen
2008/0112584 A1 * 5/2008 Karamuk ............. H04R 25/604
381/324
2009/0304216 A1 12/2009 Hansen
2014/0056454 A1 2/2014 Ganapathy et al.
(Continued)

FOREIGN PATENT DOCUMENTS

CN 204497999 U * 7/2015
CN 206719926 U * 12/2017
(Continued)

OTHER PUBLICATIONS

Sang-Soo Je et al.: "An Electromagnetically Actuated Micromachined Loudspeaker for Hearing Aids Applications", IEEE Sensors 2007 Conference, pp. 1024-1027.

*Primary Examiner* — Phylesha Dabney
(74) *Attorney, Agent, or Firm* — Laurence A. Greenberg; Werner H. Stemer; Ralph E. Locher

(57) ABSTRACT

A loudspeaker box that is particularly suitable for a hearing aid, includes a cup-like box bottom shell, which delimits a box interior for at least partially receiving a loudspeaker, and a cup-like box cover shell, which, in the intended assembly state of the loudspeaker box, is placed on the box bottom shell overlapping it for a part of its cup height to enclose the box interior and to house the loudspeaker. In the intended assembly state, the box bottom shell and the box top shell form a fluid-tight seal of the box interior in the region of their overlap by the use of a material with increased elasticity relative to the box bottom shell and/or the box cover shell. The box bottom shell and cover shell are reversibly connected to one another in a nondestructively releasable manner.

12 Claims, 4 Drawing Sheets

(56) References Cited

U.S. PATENT DOCUMENTS

| | | | | |
|---|---|---|---|---|
| 2014/0105437 | A1* | 4/2014 | Moller | H04R 25/604 381/328 |
| 2014/0185851 | A1 | 7/2014 | Van Halteren | |
| 2017/0094422 | A1 | 3/2017 | Margot et al. | |
| 2018/0020302 | A1 | 1/2018 | Rasmussen et al. | |
| 2018/0176678 | A1 | 6/2018 | Bolsman et al. | |

FOREIGN PATENT DOCUMENTS

| | | | | |
|---|---|---|---|---|
| EP | 2723100 | A1 | 4/2014 | |
| EP | 2753102 | A1 * | 7/2014 | H04R 25/604 |
| EP | 2753102 | A1 | 7/2014 | |

* cited by examiner

LOUDSPEAKER BOX AND HEARING DEVICE

CROSS-REFERENCE TO RELATED APPLICATION

This application claims the priority, under 35 U.S.C. § 119, of German Patent Application DE 10 2020 200 164.2, filed Jan. 9, 2020; the prior application is herewith incorporated by reference in its entirety.

BACKGROUND OF THE INVENTION

Field of the Invention

The invention relates to a loudspeaker box, which is configured in particular for use in a hearing device, such as a hearing aid. Furthermore, the invention relates to such a hearing device or hearing aid.

Hearing devices, in particular in the form of hearing aids, are used by persons having reduced hearing ability to at least partially compensate for their hearing loss. For this purpose, hearing aids usually comprise at least one microphone for acquiring noises from the surroundings, a signal processor for processing, which is usually specific to the hearing loss, of the acquired noises, for example a frequency-selective filtering and/or amplification, and an output transducer for relaying the processed noises to the sense of hearing of the person. Output transducers in the form of loudspeakers are usually used for the acoustic output of the processed noises. Alternatively—in particular in the case of specific types of hearing loss (e.g., damage to the middle ear or the like)—bone vibrators or cochlear implants are also used for mechanical and/or electrical stimulation of the sense of hearing.

In particular in the case of comparatively advanced hearing loss, sometimes high amplification values are also required in the acoustic output of the processed noises. Volume values of approximately 120 dB SPL (or even more) can also be required in this case (dB SPL—decibels of sound pressure level). In these cases, sound-sensitive components of the hearing aid, in particular the microphone or the respective microphone has to be protected from soundwaves originating from such a loudspeaker—both in the form of airborne sound and also in the form of structure-borne sound. So-called loudspeaker boxes are usually used for this purpose, which represent an additional housing for the loudspeaker inside the actual hearing aid housing, in order to encapsulate the loudspeaker, in particular in an airtight manner, from the remaining housing interior. The loudspeaker is regularly additionally also mounted in a vibration-reducing manner in this loudspeaker box, for example by means of an elastomer (for example a rubber or the like). Such loudspeaker boxes are integrated in this case, for example, in the "normal" hearing aid housing or are formed as separate structural units, which are preassembled as a preassembled unit and subsequently installed in the hearing aid housing. In any case, the fluid-tight closing of the loudspeaker box represents a specific problem. This is sometimes solved in that the loudspeaker box is adhesively bonded or welded.

BRIEF SUMMARY OF THE INVENTION

The invention is based on the object of specifying an improved loudspeaker box.

With the above and other objects in view there is provided, in accordance with the invention, a loudspeaker box, in particular for a hearing device. The loudspeaker box comprises:

- a cup-shaped box bottom shell formed to delimit a box interior for at least partially receiving a loudspeaker; and
- a cup-shaped box cover shell, which, in an intended assembly state of the loudspeaker box, is placed on said box bottom shell with an overlap for a part of a cup height thereof, to close the box interior and to house the loudspeaker;
- wherein said box bottom shell and said box top shell, in the intended assembly state, form a fluid-tight enclosure of the box interior by a material at the overlap that has an elasticity which is increased relative to a material of at least one of said box bottom shell or said box cover shell; and
- wherein said box bottom shell and said box cover shell are reversibly connected to one another in a nondestructively releasable manner in the intended assembly state.

In other words, the loudspeaker box according to the invention is designed and provided in particular for use in a hearing device, preferably in a hearing aid device. The loudspeaker box has a cup-like box bottom shell in this case, which delimits a box interior for at least partially receiving a loudspeaker. In addition, the loudspeaker box has a cup-like box cover shell, which, in the intended assembly state of the loudspeaker box is placed on the box bottom shell, overlapping it for a part of its cup height, to close the box interior and house the loudspeaker. In this case, the box bottom shell and the box cover shell form a fluid-tight termination of the box interior in the region of their overlap using a material increased in its elasticity in relation to the box bottom shell and/or the box cover shell. In addition, the box bottom shell and the box cover shell are reversibly connected to one another in a nondestructively detachable manner in the intended assembly state.

The terms "cup-shaped" and "cup-like" are understood here and in the following in particular to mean that the box bottom shell and the box cover shell have wall sections which delimit the box interior in five spatial directions perpendicular to one another. "Cup height" is understood here and in the following in particular to mean the length of the wall sections of the respective box shell forming the "cup side walls", which extend at least roughly or approximately at right angles from a wall section forming a bottom piece.

Due to the reversible and nondestructive disassembly option, the loudspeaker can advantageously be subjected to maintenance, for example, in a particularly simple and cost-effective manner. Nonetheless, due to the use of the material having increased elasticity, a durable fluid-tight closure of the box interior is provided.

In one expedient embodiment, the box cover shell itself is formed from the material having increased elasticity, in particular from an elastomer. The box cover shell is preferably formed in this case from a "hard rubber" (having a sufficient elasticity, i.e., in particular a higher elasticity than conventional thermoset plastics or thermoplastics) or a comparable "rigid" elastomer. This material, thus in particular the hard rubber or the elastomer, preferably has a hardness of 50-90, preferably of 50-70 according to Shore A. A fluoroelastomer is preferably used. A comparatively high dimensional stability and strength, for example, for stable installation in a higher-order device housing, for example, a hearing aid housing, is thus advantageously provided. Furthermore, the box cover shell preferably additionally forms an interference fit (also referred to as a press fit) with the box bottom shell. A self-retaining, friction-locked, and also sealed connection is thus enabled between the box bottom shell and the box cover shell.

In a further expedient embodiment, the box bottom shell is formed from a plastic having increased rigidity, for example, a fiber-reinforced, in particular a (short) glass-fiber-reinforced thermoplastic or an unreinforced high-performance plastic, for example polyphenylene sulfide (PPS), or from a metal. This rigid embodiment of the box bottom shell represents a dimensionally-stable counterpart for the box cover shell and thus enables a durable sealed connection of the box bottom shell to the box cover shell. Moreover, in particular by the selection of metal in particular (possibly also a plastic which has a comparatively high density and/or is filled), the total weight of the loudspeaker box can be increased, which is in turn advantageous for reducing a reproduction of loudspeaker vibrations in the form of structure-borne sound.

The above-described "heavy" embodiment of the loudspeaker box can already damp the transfer of structure-borne sound from the loudspeaker to surrounding device components, but nonetheless in an additional or alternative embodiment, the loudspeaker is mounted by means of elastic mounting means in relation to the box bottom shell and/or the box top shell in the box interior in the intended assembly state for (possibly further) vibration damping. In particular, the loudspeaker is supported here in at least four, preferably five or six different spatial directions in the box interior. On the one hand, frequently occurring manufacturing tolerances between the loudspeaker box and the loudspeaker can thus advantageously be compensated for, which in turn enables manufacturing with broader tolerances and thus also lower manufacturing costs. On the other hand, impacts of the loudspeaker on the loudspeaker box can also be suppressed.

In a further expedient embodiment, in the intended assembly state of the loudspeaker box, in the region of the overlap between the box bottom shell and the box cover shell, at least one seal element made of the above-described elastic material or a further material having increased elasticity is mounted between these two shells. This seal element is used here at least for assisting the formation of the fluid-tight termination of the box interior, in particular if the box cover shell is formed from the above-described elastic material. In an optional variant, if this seal element is used, the box cover shell is in contrast (also) formed from a rigid material, for example from a plastic of the above-described type (for the box bottom shell) or also from a metal (optionally from the same material as the box bottom shell). The box interior is sealed off in particular in the latter case due to a clamping and elastic deformation of the seal element between the box bottom shell and the box cover shell. In this case, the seal element is also used in particular for the friction-locked fixation of the box cover shell on the box bottom shell, preferably in that it has a material thickness exceeding an assembly gap between the box cover shell and the box bottom shell.

In one expedient refinement, the above-described seal element is integrally formed with the above-mentioned mounting means. The number of individual parts is thus advantageously reduced and the assembly is therefore simplified.

The mounting means are preferably formed by pyramidal nubs (i.e., for example, having the shape of a tetrahedron, a square or polygonal pyramid, or also a cone), on the tips of which the loudspeaker rests in the intended assembly state (and regularly also at least slightly deforms these nubs).

In one expedient refinement, these nubs protrude on the inside from a ring strip, which forms the seal element preferably integrally connected to the nubs. In addition, in the intended assembly state, the nubs protrude from an outside through corresponding passages in the box bottom shell into the box interior. Accordingly, in this case the ring strip rests on an outer surface of the box bottom shell and preferably seals off the passages (also referred to as windows) to the outside at the same time. Furthermore, the passages are preferably positioned here in the region of the box bottom shell in which the box cover shell overlaps the box bottom shell in the intended assembly state. In the intended assembly state, the nubs thus support themselves indirectly via the ring strip against the inner surface of the box cover shell.

In one expedient embodiment, the box bottom shell or the box cover shell has a sound passage opening. A deliberate emission of airborne sound takes place through this opening in the intended operation of the loudspeaker, preferably into a sound channel, for example a sound tube or the like, coupled to the sound passage opening (preferably airtight transversely to its longitudinal extension).

The hearing aid according to the invention, in particular the hearing aid device, includes the above-described loudspeaker box. The hearing aid also preferably includes the loudspeaker accommodated in the loudspeaker box, and also the above-mentioned hearing aid housing, in which further components, for example a signal processor and at least one microphone, and the loudspeaker box are installed.

The hearing aid therefore similarly also has the features described in conjunction with the loudspeaker box and the advantages resulting therefrom.

A "friction lock" or a "friction-locked connection" between at least two parts connected to one another is understood here and in the following in particular to mean that the parts connected to one another are prevented from sliding on one another due to a friction force acting between them. If a "connecting force" inducing this friction force is absent (i.e., the force which presses the parts against one another, for example a screw force or the weight force itself, in the present case in particular a clamping force between the box bottom shell and the box cover shell due to an interference fit and/or the mounting of the seal element in between), the friction-locked connection cannot be maintained and is thus released.

The conjunction "and/or" is to be understood here and in the following in particular in such a way that the features linked by means of this conjunction can be formed both jointly and also as alternatives to one another.

Other features which are considered as characteristic for the invention are set forth in the appended claims.

Although the invention is illustrated and described herein as embodied in loudspeaker box and hearing aid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Parts that correspond to one another are provided with the same reference signs throughout the figures.

DETAILED DESCRIPTION OF THE INVENTION

Figure 1:
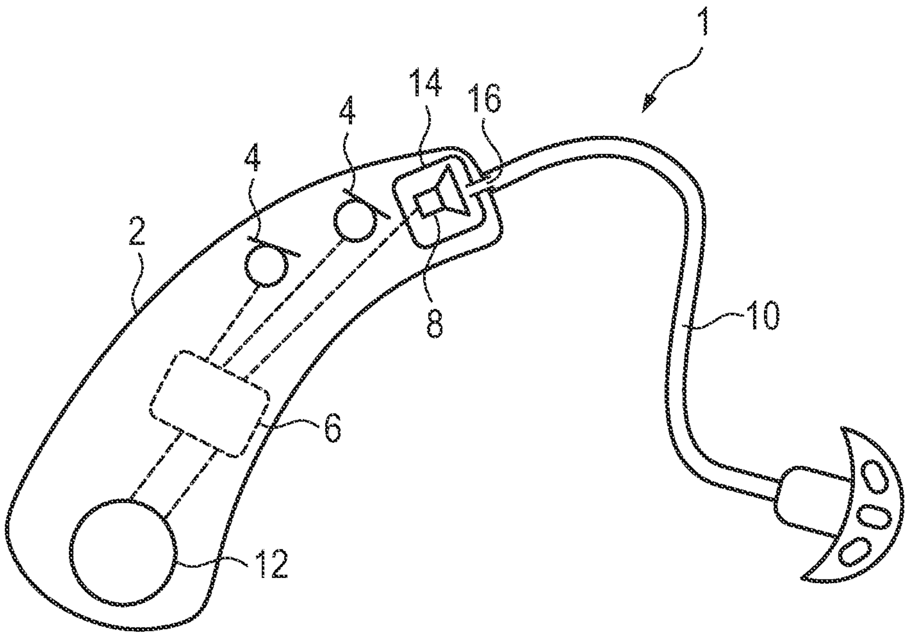
FIG. 1 is a schematic illustration of a hearing aid.

Referring now to the figures of the drawing in detail and first, in particular, to FIG. 1 thereof, there is shown a hearing device 1, specifically a hearing aid. The hearing device will be referred as a hearing aid 1 throughout. The hearing aid 1 includes a hearing aid housing 2 to be worn behind the ear of a user (i.e., a BTE device). The housing 2 is configured to receive electronic components of the hearing aid 1, for example microphones 4, a signal processor 6, and a loudspeaker 8. The hearing aid 1 includes a sound tube 10 coupled to the hearing aid housing 2 for relaying acoustic signals output on the part of the loudspeaker 8 to the sense of hearing of the user. In addition, a battery 12, optionally a rechargeable battery or a primary cell, is accommodated in the hearing aid housing 2 for the power supply of the electronic components.

The hearing aid 1 is one which outputs the acoustic output signals with a comparatively high volume value (greater than 90 or 100 dBSPL), in order to care for users having a correspondingly strong hearing difficulty. Due to the high sound power of the loudspeaker 8, it is necessary in particular to protect the microphones 4 from feedback due to the sound emitted by the loudspeaker 8—both in the form of airborne sound and also structure-borne sound (i.e., vibrations originating from the loudspeaker 8). For this purpose, the hearing aid 1 includes a loudspeaker box 14 arranged inside the hearing aid housing 2, which encloses the loudspeaker 8 in such a way that emission of airborne sound into the interior of the hearing aid housing 2 is suppressed. The loudspeaker box 14 solely has a fluidic connection to the sound tube 10 via a sound passage opening 16.

Figure 4:
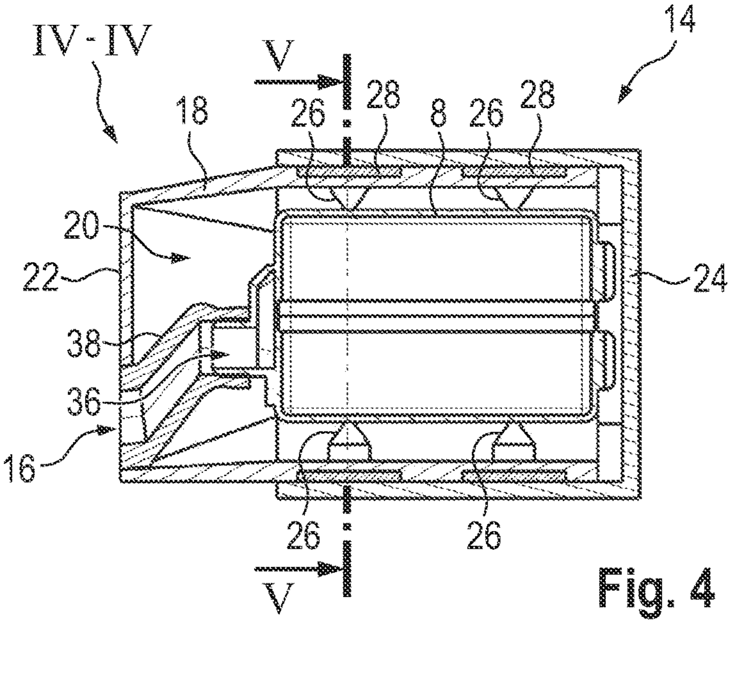
FIG. 4 shows the loudspeaker box in an intended assembly state in a schematic longitudinal section taken along the line IV-IV in FIG. 5.
Figure 5:
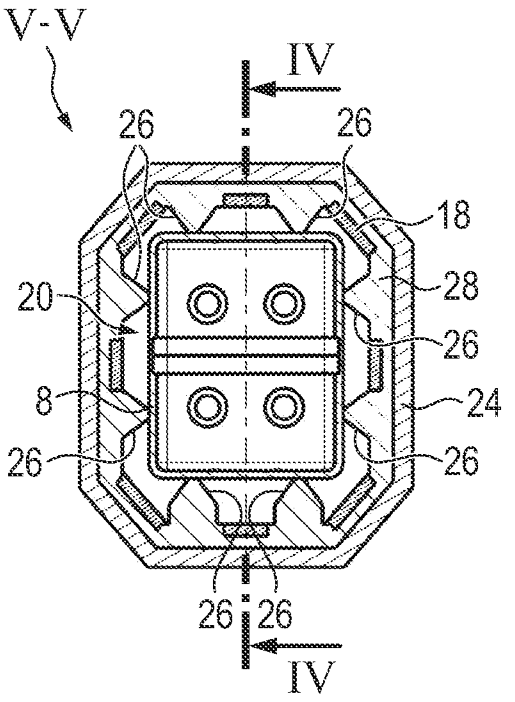
FIG. 5 is a cross section taken along the line V-V in FIG. 4.
Figure 6:
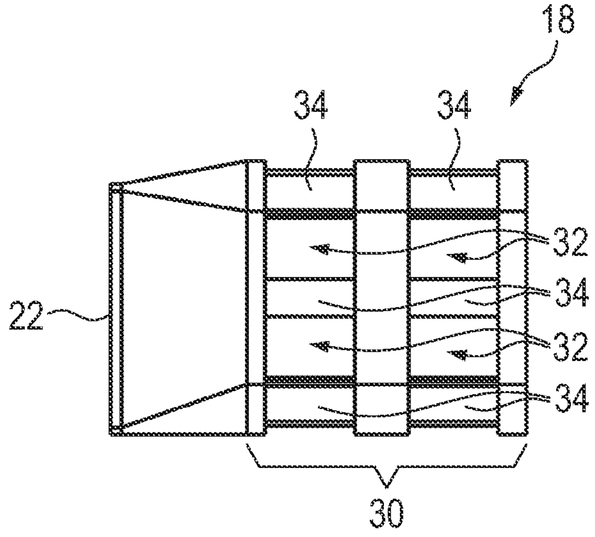
FIG. 6 shows a box bottom shell of the loudspeaker box in a schematic side view.
Figure 7:
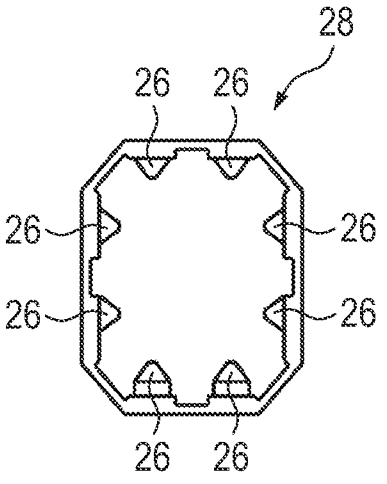
FIG. 7 shows a mounting element for the loudspeaker in a schematic top view.

In the illustrated exemplary embodiment, the loudspeaker box 14 (cf. also FIG. 2) is manufactured separately from the hearing aid housing 2 and is therefore installed therein. The loudspeaker box 14 includes a box bottom shell 18 here (cf. FIGS. 2 to 6), in which the loudspeaker 8 is received in the intended assembly state (cf. FIG. 4). The box bottom shell 18 is formed cup-shaped and is thus only completely open in one spatial direction to receive the loudspeaker 8 in a box interior 20 defined by the box bottom shell 18. The other five spatial directions, in contrast, are (at least partially) concealed by (side) wall sections of the box bottom shell 18. The sound passage opening 16 is arranged in a base part 22 of the box bottom shell 18. The loudspeaker box 14 includes a box cover shell 24—also formed cup-shaped—for the fluid-tight closing of the box interior 20 (except for the sound passage opening 16). In the intended assembly state, this shell is pushed onto the box bottom shell 18 and partially overlaps it.

Figure 2:
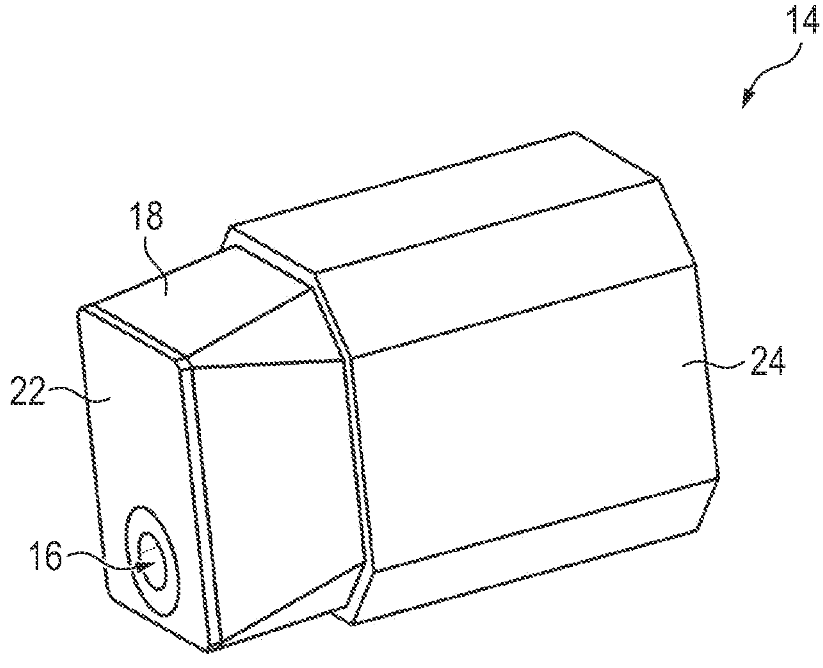
FIG. 2 shows a loudspeaker box for a loudspeaker of the hearing aid in a schematic perspective view.
Figure 3:
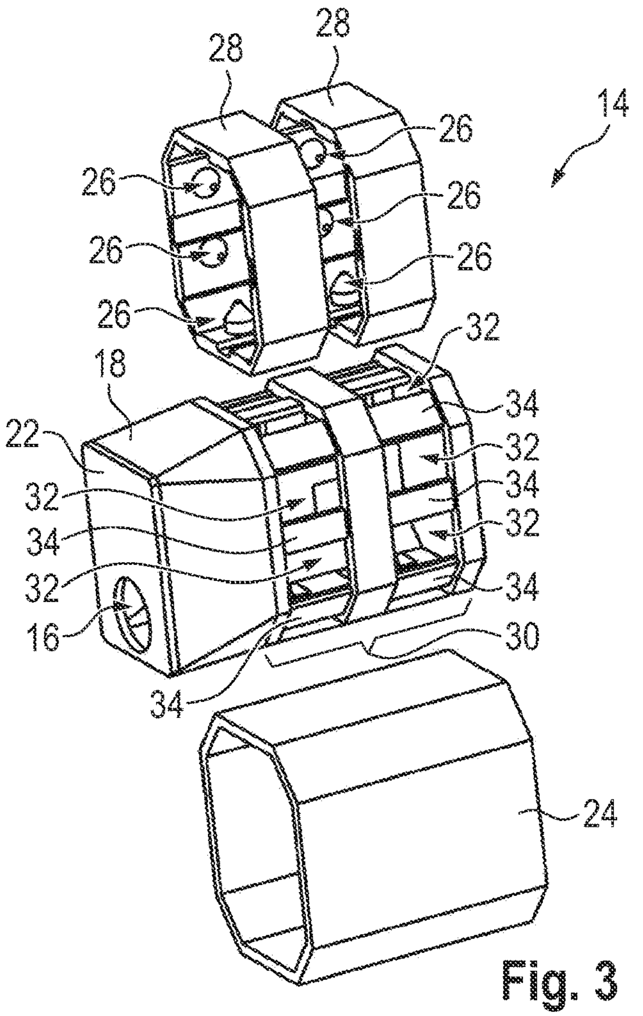
FIG. 3 shows the loudspeaker box in a schematic exploded illustration.

In the exemplary embodiment according to FIG. 2, the box bottom shell 18 is injection molded from an industrial rigid plastic (for example a polyamide, an acrylonitrile butadiene styrene, or a polyphenylene sulfide; possibly fiber reinforced in each case) and the box cover shell 24 is manufactured from a plastic which is elastic in comparison thereto, specifically a comparatively rigid elastomer, for example a fluoroelastomer and/or an elastomer having at least 50-70 Shore hardness A. The box cover shell 24 is manufactured undersized in its internal dimensions (specifically in the region of the "top edge") in relation to the corresponding external dimensions of the box bottom shell 18. An interference fit or press fit is thus predetermined between the box bottom shell 18 and the box cover shell 24, which—due to the comparatively elastic material of the box cover shell 24—results in a fluid-tight and friction-locked connection of the two. For example, a materially bonded connection (welding, adhesive bonding), which thus can hardly be released nondestructively, can therefore be omitted. The box cover shell 24 is thus reversibly removable from the box bottom shell 18. The loudspeaker 8 arranged in the box interior 20 can be maintained in a simple manner.

For vibration damping, the loudspeaker 8 is additionally mounted in the intended assembly state by means of mounting means formed from elastomer, here in the form of pyramidal nubs 26, in the box interior 20. These nubs 26 are formed internally protruding on two ring strips 28. The ring strips 28 rest in the intended assembly state on the outside on an overlap region 30 of the box bottom shell 18 with the box cover shell 24. The box bottom shell 18 is perforated in this overlap region 30, specifically multiple windows 32 are formed therein, which form passages into the box interior 20 and are spaced apart from one another by webs 34. The nubs 26 protrude into the box interior 20 through the windows 32. The box cover shell 24 presses from the outside against the ring strips 28 (see FIG. 4) and thus forms the buttress for the nubs 26. In this case, the ring strips can additionally also assume a sealing function between box cover shell 24 and box bottom shell 18.

The loudspeaker 8 is designed in the illustrated exemplary embodiment as a so-called double loudspeaker. Specifically, the loudspeaker 8 includes two single loudspeakers coupled to one another. A shared sound output nozzle 36 is connected in the intended assembly state via a tube part 38 to the sound passage opening 16.

Figure 8:
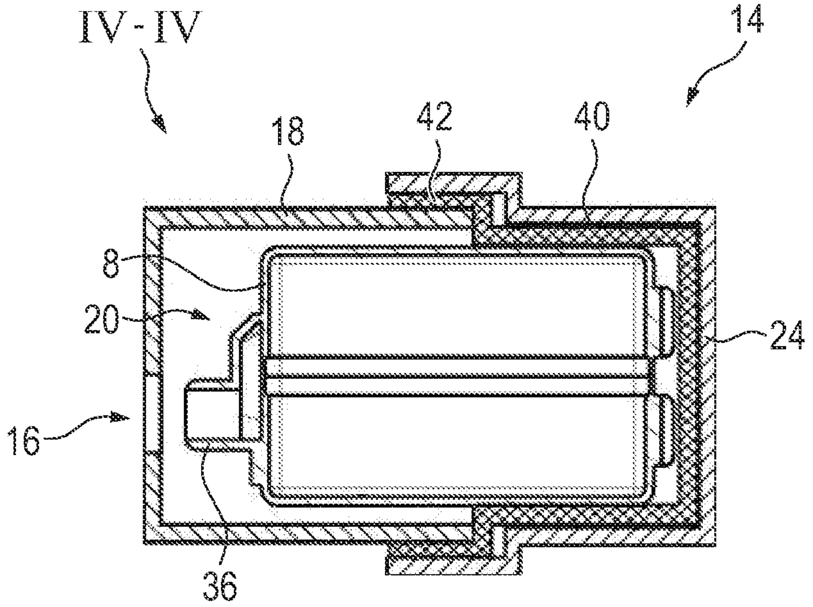
FIG. 8 shows an alternative exemplary embodiment of the loudspeaker box in a sectional view according to FIG. 4.

An alternative exemplary embodiment of the loudspeaker box 14 is shown in FIG. 8. The mounting means for mounting the loudspeaker 8 in the box interior 20 are formed by a coating 40 which is formed from an elastomer and partially encloses the loudspeaker 8 like a stocking. A ring-shaped sealing strip 42 is formed on the coating 40, which rests in the intended assembly state on the outside on the box bottom shell 18. The box cover shell 24 is dimensioned in such a way that a clamping force is exerted on the sealing strip 42, which enables, on the one hand, the fluid-tight connection and, on the other hand, the friction-locked connection of the box cover shell 24 to the box bottom shell 18. The tube part 38 is not shown in this case.

In a variant of the exemplary embodiment according to FIG. 8, the box cover shell 24 is also formed from a rigid material, for example the above-mentioned industrial plastics or a metal.

The subject matter of the invention is not restricted to the above-described exemplary embodiments. Rather, further embodiments of the invention can be derived by a person skilled in the art from the above description. In particular, the individual features of the invention described on the basis of the various exemplary embodiments and their embodiment variants can also be combined with one another in another way.

The following is a summary list of reference numerals and the corresponding structure used in the above description of the invention:

The following is a summary list of reference numerals and the corresponding structure used in the above description of the invention:

1 hearing aid
2 hearing aid housing
4 microphone
6 signal processor
8 loudspeaker
10 sound tube
12 battery
14 loudspeaker box
16 sound passage opening
18 box bottom shell
20 box interior
22 base part
24 box cover shell
26 nub
28 ring strip
30 overlap region
32 window
34 web
36 sound output nozzle
38 tube part
40 coating
42 sealing strip

The invention claimed is:

1. A loudspeaker box, comprising:

a cup-shaped box bottom shell formed to delimit a box interior for at least partially receiving a loudspeaker; and a cup-shaped box cover shell, which, in an intended assembly state of the loudspeaker box, is placed on said box bottom shell with an overlap for a part of a cup height thereof, to close the box interior and to house the loudspeaker;

wherein said box bottom shell and said a box top shell, in the intended assembly state, form a fluid-tight enclosure of the box interior by a material at the overlap that has an elasticity which is increased relative to a material of at least one of said box bottom shell or said box cover shell; and wherein said box bottom shell and said box cover shell are reversibly connected to one another in a nondestructively releasable manner in the intended assembly state.

2. The loudspeaker box according to claim 1, wherein said box cover shell is formed from the material having the increased elasticity, and is formed with an interference fit with the box bottom shell.

3. The loudspeaker box according to claim 2, wherein said box cover shell is formed from an elastomer.

4. The loudspeaker box according to claim 1, wherein said box bottom shell is formed from a plastic having increased rigidity or from a metal.

5. The loudspeaker box according to claim 1, further comprising elastic mounts for mounting the loudspeaker relative to said box bottom shell and/or said box cover shell in the box interior in the intended assembly state for vibration damping.

6. The loudspeaker box according to claim 1, further comprising a seal element which, in the intended assembly state, is disposed between said box bottom shell and said box cover shell, at least in a region of the overlap therebetween, and said seal element is formed of the material having the increased elasticity and is configured at least to assist in forming a fluid-tight seal of the box interior.

7. The loudspeaker box according to claim 6, further comprising elastic mounts for mounting the loudspeaker relative to said box bottom shell and/or said box cover shell in the box interior in the intended assembly state for vibration damping, and wherein said seal element is integrally formed with said mount.

8. The loudspeaker box according to claim 6, wherein said mount are pyramidal nubs with tips on which the loudspeaker rests in the intended assembly state.

9. The loudspeaker box according to claim 8, wherein said nubs protrude on the inside from a ring strip forming said seal element and in the intended assembly state protrude from an outside through corresponding passages in said box bottom shell into the box interior.

10. The loudspeaker box according to claim 1, wherein said box bottom shell or said box cover shell is formed with a sound passage opening, through which a guided emission of airborne sound takes place in an intended operation of the loudspeaker.

11. The loudspeaker box according to claim 1, configured for incorporation in a hearing aid.

12. A hearing aid, comprising: a loudspeaker box according to claim 1.

* * * * *